United States Patent
Maheshwari et al.

(10) Patent No.: US 8,374,621 B2
(45) Date of Patent: Feb. 12, 2013

(54) METHODS AND APPARATUS FOR REDUCING THE LIKELIHOOD OF DEADLOCK IN A WIRELESS COMMUNICATION SYSTEM

(75) Inventors: Shailesh Maheshwari, San Diego, CA (US); Thomas Klingenbrunn, San Diego, CA (US); Srividhya Krishnamoorthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 973 days.

(21) Appl. No.: 11/859,637

(22) Filed: Sep. 21, 2007

(65) Prior Publication Data

US 2008/0080381 A1 Apr. 3, 2008

Related U.S. Application Data

(60) Provisional application No. 60/827,626, filed on Sep. 29, 2006.

(51) Int. Cl.
*H04W 72/00* (2009.01)
*H04B 7/00* (2006.01)
(52) U.S. Cl. .................................. 455/452.2; 455/509
(58) Field of Classification Search .......... 455/450–453, 455/455–456.3, 509, 516, 454; 370/229–231, 370/395.1, 395.4, 395.41, 470, 395
See application file for complete search history.

(56) References Cited

U.S. PATENT DOCUMENTS

| 6,785,232 | B1 * | 8/2004 | Kotser et al. | 370/230.1 |
| 6,957,071 | B1 * | 10/2005 | Holur et al. | 455/452.2 |
| 7,023,840 | B2 * | 4/2006 | Golla et al. | 370/360 |
| 2004/0082356 | A1 * | 4/2004 | Walton et al. | 455/522 |
| 2006/0133322 | A1 | 6/2006 | Vannithamby et al. | |
| 2008/0008152 | A1 * | 1/2008 | Lohr et al. | 370/342 |
| 2008/0043670 | A1 * | 2/2008 | Marinier | 370/329 |

FOREIGN PATENT DOCUMENTS

| CN | 1473415 A | 2/2004 |
| EP | 1679841 | 7/2006 |
| JP | 2008535336 A | 8/2008 |
| WO | WO0205453 A2 | 1/2002 |

OTHER PUBLICATIONS

"Universal Mobile Telecommunications System (UMTS); Medium Access Control (MAC) protocol specification (3GPP TS 25.321 version 7.2.0 Release 7); ETSI TS 125 321" ETSI Standards, European Telecommunications Standards Institute, Sophia-Antipo, FR, vol. 3-R2, No. V720, Sep. 1, 2006, XP014035576, ISSN: 0000-0001.
International Search Report—PCT/US07/079997, International Search Authority—European Patent Office—Apr. 28, 2008.

(Continued)

*Primary Examiner* — Melody Mehrpour
*Assistant Examiner* — Emem Stephen
(74) *Attorney, Agent, or Firm* — Kevin T. Cheatham

(57) ABSTRACT

In accordance with a method for reducing the likelihood of deadlock in a wireless communication system, user equipment may determine that user equipment has data to transmit. The data may correspond to a scheduled flow. The user equipment may determine that a scheduled grant corresponding to the scheduled flow is insufficient to transmit at least one protocol data unit. An insufficiency indicator may be transmitted to a scheduler at least once. The insufficiency indicator may include an indication that the scheduled grant is insufficient to transmit at least one protocol data unit.

27 Claims, 12 Drawing Sheets

OTHER PUBLICATIONS

Written Opinion—PCT/US07/079997, International Search Authority—European Patent Office—Apr. 28, 2008.

3rd Generation Partnership Project; Technical Specification Group Radio Access Network; "Medium Access Control (MAC) protocol specification," 3GPP TS 25.321, V7.1.0, Jun. 2006, pp. 1-92.

Taiwan Search Report—TW096136666—TIPO—Dec. 23, 2011.

"Universal Mobile Telecommunications System (UMTS); Medium Access Control (MAC) protocol specification", 3GPP TS 25.321 version 7.1.0 Release 7, Jun. 2006.

* cited by examiner

METHODS AND APPARATUS FOR REDUCING THE LIKELIHOOD OF DEADLOCK IN A WIRELESS COMMUNICATION SYSTEM

CLAIM OF PRIORITY UNDER 35 U.S.C. §119

The present Application for Patent claims priority to Provisional Application No. 60/827,626 entitled "A MECHANISM FOR DEADLOCK AVOIDANCE WHEN THE GRANT IS INSUFFICIENT TO TRANSFER DATA ON THE HSUPA CHANNELS" filed Sep. 29, 2006, and assigned to the assignee hereof and hereby expressly incorporated by reference herein.

TECHNICAL FIELD

The present disclosure relates generally to wireless communication systems. More specifically, the present disclosure relates to methods and apparatus for reducing the likelihood of deadlock in a wireless communication system.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality.

A wireless communication system may simultaneously support communication for user equipment (UE). UEs may alternatively be referred to as mobile stations, stations, access terminals, user terminals, terminals, subscriber units, etc. Each UE may communicate with one or more Node Bs (which may alternatively be referred to as base stations, access points, etc.) via transmissions on the uplink and the downlink. The uplink (or reverse link) refers to the communication link from the UEs to the Node Bs, and the downlink (or forward link) refers to the communication link from the Node Bs to the UEs.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. A Node B may assign various system resources to individual UEs that are supported by the Node B.

The present disclosure relates generally to the way in which system resources may be allocated to UEs within a wireless communication system. More specifically, the present disclosure relates to methods and apparatus for reducing the likelihood of deadlock (and in some cases, avoiding deadlock) in a wireless communication system. In this context, the term deadlock may refer to a situation where a UE has data to transmit on the uplink, but system resources are not allocated to the UE to a sufficient extent so as to permit the UE to transmit the data on the uplink.

DETAILED DESCRIPTION

Figure 1:
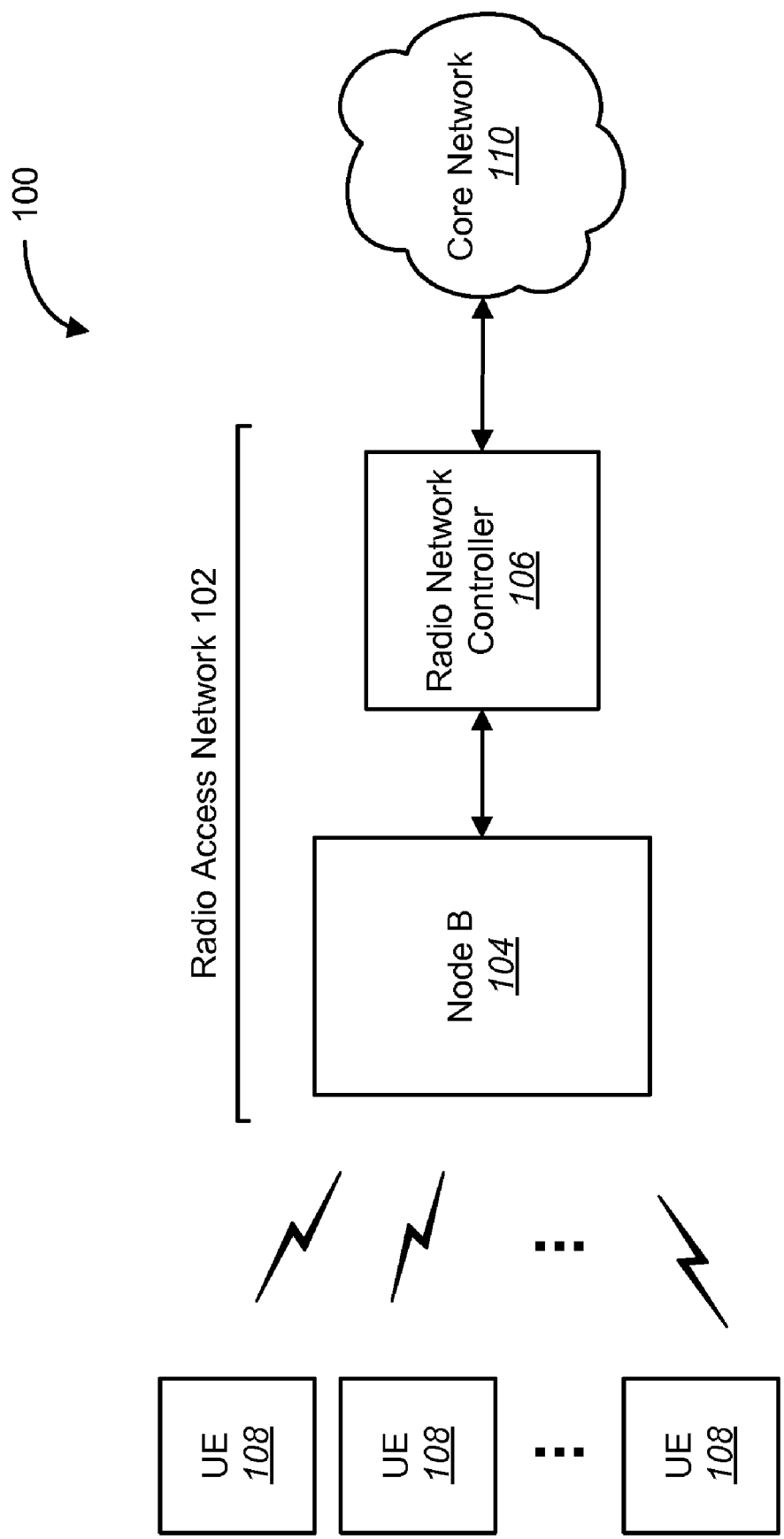
FIG. 1 illustrates some aspects of a wireless communication system that may be configured in accordance with the Universal Mobile Telecommunications System (UMTS)

A method for reducing the likelihood of deadlock in a wireless communication system is disclosed. In accordance with the method, user equipment may determine that user equipment has data to transmit. The data may correspond to a scheduled flow. The user equipment may determine that a scheduled grant corresponding to the scheduled flow is insufficient to transmit at least one protocol data unit. An insufficiency indicator may be transmitted to a scheduler at least once. The insufficiency indicator may include an indication that the scheduled grant is insufficient to transmit at least one protocol data unit.

User equipment that is configured for reducing the likelihood of deadlock in a wireless communication system is also disclosed. The user equipment may include a processor and memory in electronic communication with the processor. Instructions may be stored in the memory. The instructions may be executable to determine that user equipment has data to transmit. The data may correspond to a scheduled flow. The instructions may also be executable to determine that a scheduled grant corresponding to the scheduled flow is insufficient to transmit at least one protocol data unit. The instructions may also be executable to transmit an insufficiency indicator to a scheduler at least once. The insufficiency indicator may include an indication that the scheduled grant is insufficient to transmit at least one protocol data unit.

An apparatus for reducing the likelihood of deadlock in a wireless communication system is also disclosed. The apparatus may include means for determining that user equipment has data to transmit. The data may correspond to a scheduled flow. The apparatus may also include means for determining that a scheduled grant corresponding to the scheduled flow is insufficient to transmit at least one protocol data unit. The apparatus may also include means for transmitting an insufficiency indicator to a scheduler at least once. The insufficiency indicator may include an indication that the scheduled grant is insufficient to transmit at least one protocol data unit.

A computer-program product for reducing the likelihood of deadlock in a wireless communication system is also disclosed. The computer-program product may include a computer readable medium having instructions thereon. The instructions may include code for determining that user equipment has data to transmit. The data may correspond to a scheduled flow. The instructions may also include code for determining that a scheduled grant corresponding to the scheduled flow is insufficient to transmit at least one protocol data unit. The instructions may also include code for transmitting an insufficiency indicator to a scheduler at least once. The insufficiency indicator may include an indication that the scheduled grant is insufficient to transmit at least one protocol data unit.

3G is the third generation of mobile phone standards and technology. It is based on the International Telecommunication Union (ITU) family of standards under the International Mobile Telecommunications program (IMT-2000). 3G technologies enable network operators to offer users a wider range of more advanced services while achieving greater network capacity through improved spectral efficiency. Services include wide-area wireless voice telephony and broadband wireless data, all in a mobile environment.

The Universal Mobile Telecommunications System (UMTS) is one of the 3G cell phone technologies. UMTS is standardized by the 3rd Generation Partnership Project (3GPP). UMTS utilizes Wideband Code Division Multiple Access (W-CDMA) as the underlying air interface. For purposes of example, the methods and apparatus disclosed herein will be described in relation to UMTS systems. However, the scope of the present disclosure is not limited to UMTS systems.

FIG. 1 illustrates some aspects of a wireless communication system 100 that may be configured in accordance with UMTS. A radio access network (RAN) 102 is shown with a Node B 104 and a radio network controller (RNC) 106. For simplicity, only one Node B 104 and one RNC 106 are shown in FIG. 1. However, the RAN 102 may include any number of Node B 104s and any number of RNCs 106. The RAN 102 may also include other components that are not shown in FIG. 1.

The Node B 104 may be a fixed station that communicates with user equipment (UE) 108. The Node B 104 may alternatively be referred to as a base station, an access point, or some other terminology. The Node B 104 may provide communication coverage for a particular geographic area and may support communication for the UEs 108 that are located within the coverage area.

The RNC 106 may provide coordination and control for the Node B 104. The RNC 106 is shown in electronic communication with a core network 110. The core network 110 may include various entities that support functions such as packet routing, user registration, mobility management, and so on.

The UEs 108 may communicate with the Node B 104 in the RAN 102. The UEs 108 may be stationary or mobile, and may alternatively be referred to as mobile stations, stations, user terminals, access terminals, terminals, subscriber units, etc. The UEs 108 may be cellular phones, wireless devices, personal digital assistants (PDAs), handheld devices, wireless modems, laptop computers, etc.

Figure 2:
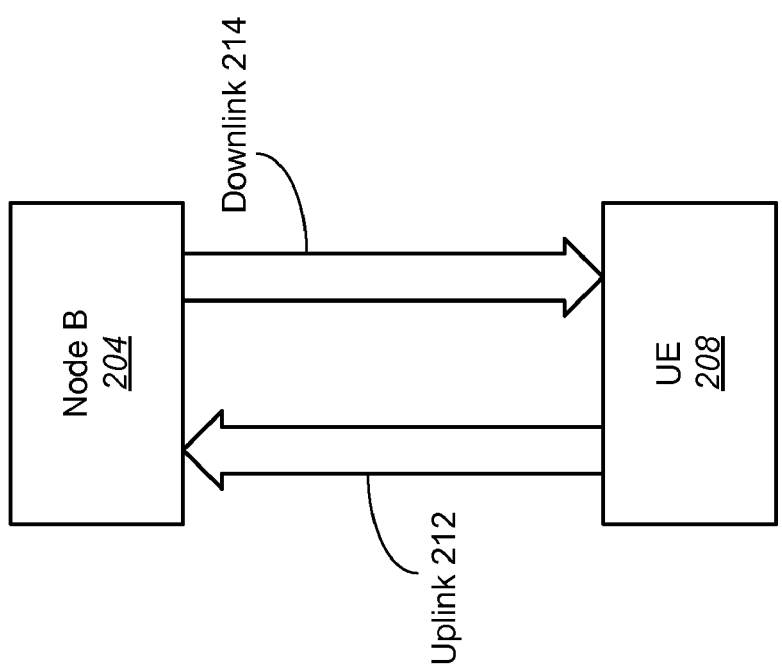
FIG. 2 illustrates an uplink and a downlink between a Node B and user equipment (UE)

FIG. 2 illustrates an uplink 212 and a downlink 214 between a Node B 204 and a UE 208. The uplink 212 refers to transmissions from the UE 208 to the Node B 204. The downlink 214 refers to transmissions from the Node B 204 to the UE 208.

Figure 3:
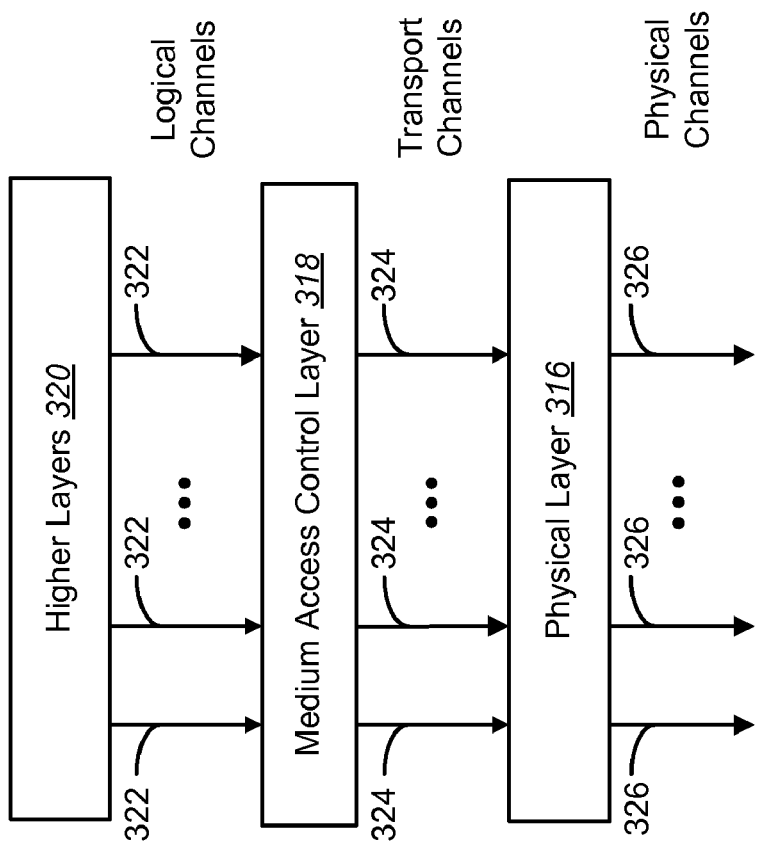
FIG. 3 illustrates some aspects of a layered communications architecture for a UMTS system.

The UMTS specification defines a layered communications architecture, where a layer is a collection of related functions that provides services to the layer above it and/or that receives service from the layer below it. FIG. 3 illustrates some aspects of the layered communications architecture for a UMTS system. The current UMTS specification defines a physical layer 316, a medium access control (MAC) layer 318, as well as higher layers 320.

The MAC layer 318 receives data from one or more logical channels 322 from the higher layers 320. A logical channel 322 may correspond to a specific application, such as voice over IP (VoIP), videotelephony, file transfer protocol (FTP), gaming, etc.

The physical layer 316 offers data transport services via physical channels 326 to the higher layers 320. The access to these services is through the use of transport channels 324 via the MAC layer 318. The characteristics of a transport channel 324 are defined by its transport format (or format set) specifying the physical layer 316 processing to be applied to the transport channel 324 in question, such as convolutional channel coding and interleaving, and any service-specific rate matching as needed.

A UMTS system may be configured to support High-Speed Uplink Packet Access (HSUPA). HSUPA includes channels and procedures that enable high-speed packet data transmission on the uplink 212.

Figure 4:
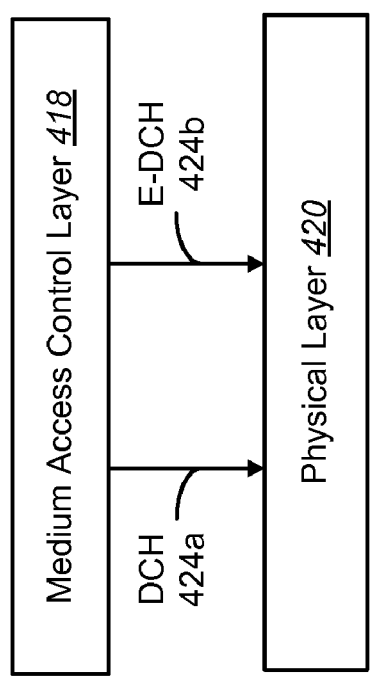
FIG. 4 illustrates two transport channels that may exist between a medium access control (MAC) layer and a physical layer in a UMTS system.

FIG. 4 illustrates two transport channels 424a, 424b that may exist between a MAC layer 418 and a physical layer 416 in a UMTS system. In particular, FIG. 4 illustrates a Dedicated Channel (DCH) 424a and an Enhanced Dedicated Channel (E-DCH) 424b. Both the DCH 424a and the E-DCH 424b are transport channels that may be used by a UE 108. The E-DCH 424b is associated with HSUPA. The E-DCH 424b may be able to transfer uplink 212 data faster than the DCH 424a.

Figure 5:
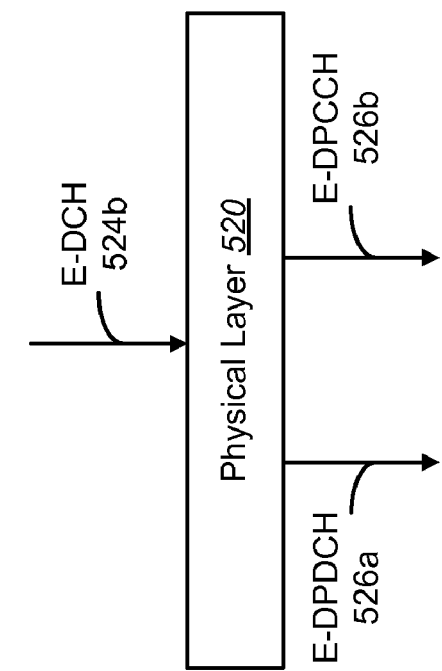
FIG. 5 illustrates two physical channels on the uplink that are associated with High-Speed Uplink Packet Access (HSUPA)

FIG. 5 illustrates two physical channels 526a, 526b on the uplink 212 that are associated with HSUPA. In particular, FIG. 5 illustrates an E-DCH Dedicated Physical Data Channel (E-DPDCH) 526a and an E-DCH Dedicated Physical Control Channel (E-DPCCH) 526b. The E-DPDCH 526a is a physical channel that may be used to carry the E-DCH transport channel 524b. The E-DPCCH 526b is a physical channel that may be used to transmit control information associated with the E-DCH 524b.

Figure 6:
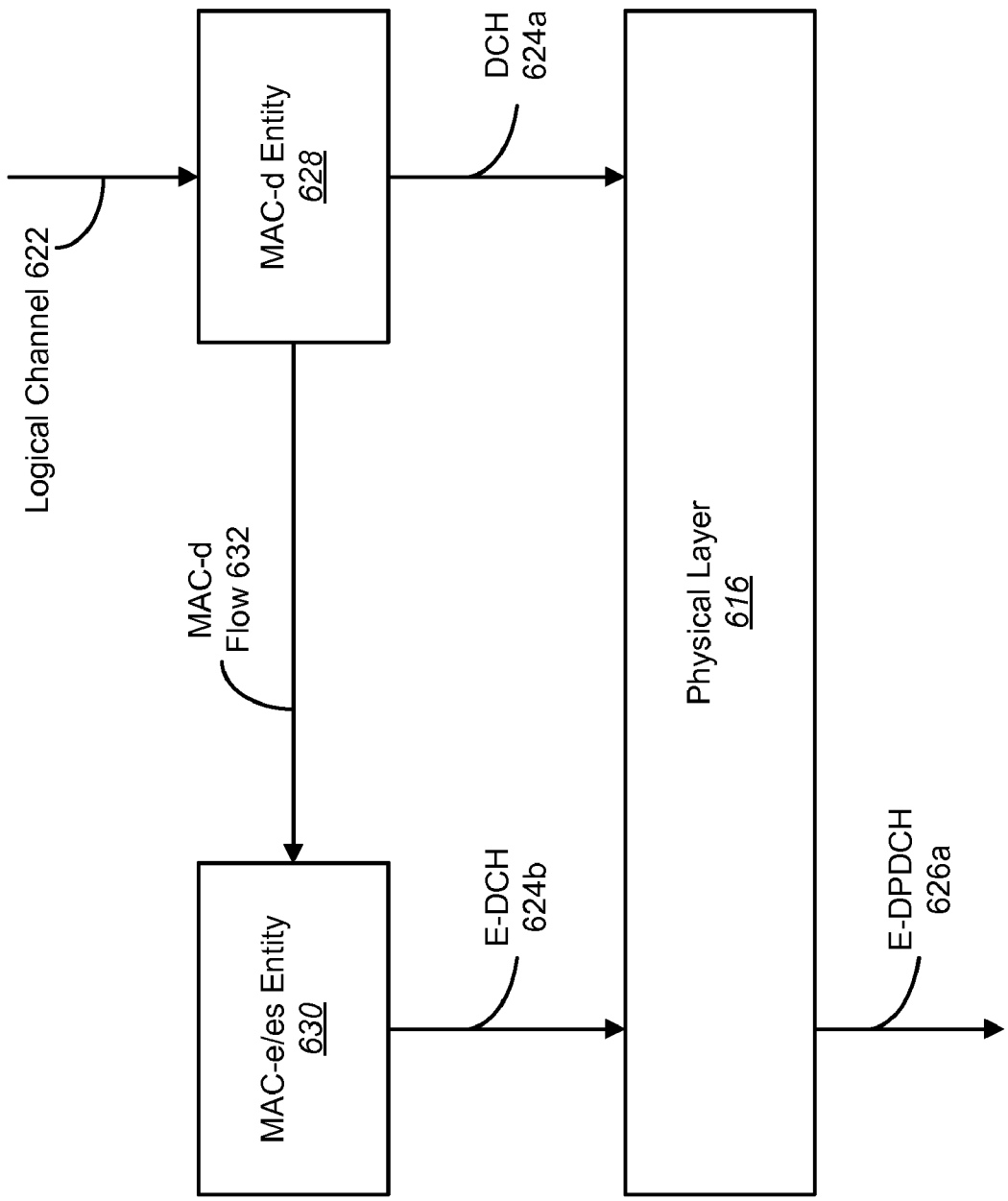
FIG. 6 illustrates a MAC-d entity and a MAC-e/es entity within a MAC layer of a UMTS system.

FIG. 6 illustrates a MAC-d entity 628 and a MAC-e/es entity 630. The MAC-d entity 628 and the MAC-e/es entity are defined in the UMTS specification as part of the MAC layer 318. The MAC-d entity 628 supports the DCH 624a. The MAC-e/es entity 630 supports the E-DCH 624b.

A MAC-d flow 632 may be defined between the MAC-d entity 628 and the MAC-e/es entity 630 for the E-DCH 624b. A logical channel 622 may be mapped to the MAC-d flow 632 via the MAC-d entity 628. The MAC-d flow 632 may be mapped to the E-DCH 624b via the MAC-e/es entity 630. The E-DCH 624b may be mapped to the E-DPDCH 626a via the physical layer 616. The DCH 624a may be mapped to the DPDCH 626c via the physical layer 616.

Figure 7:
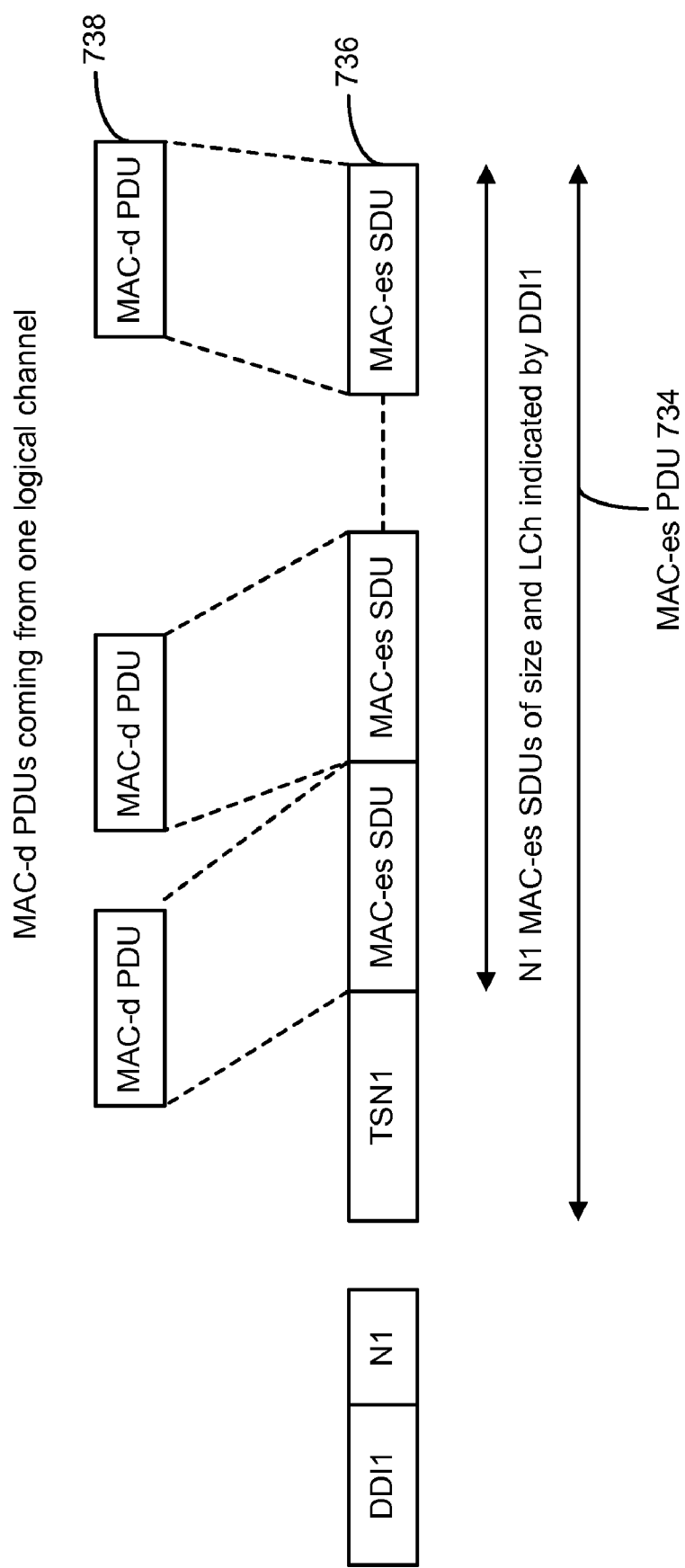
FIG. 7 illustrates a MAC-es protocol data unit (PDU)

The UMTS specification defines protocol data units (PDUs). FIG. 7 illustrates a MAC-es PDU 734. A MAC-es PDU 734 may include multiple MAC-es service data units (SDUs) 736. A MAC-es SDU 736 corresponds to a MAC-d PDU 738.

Figure 8:
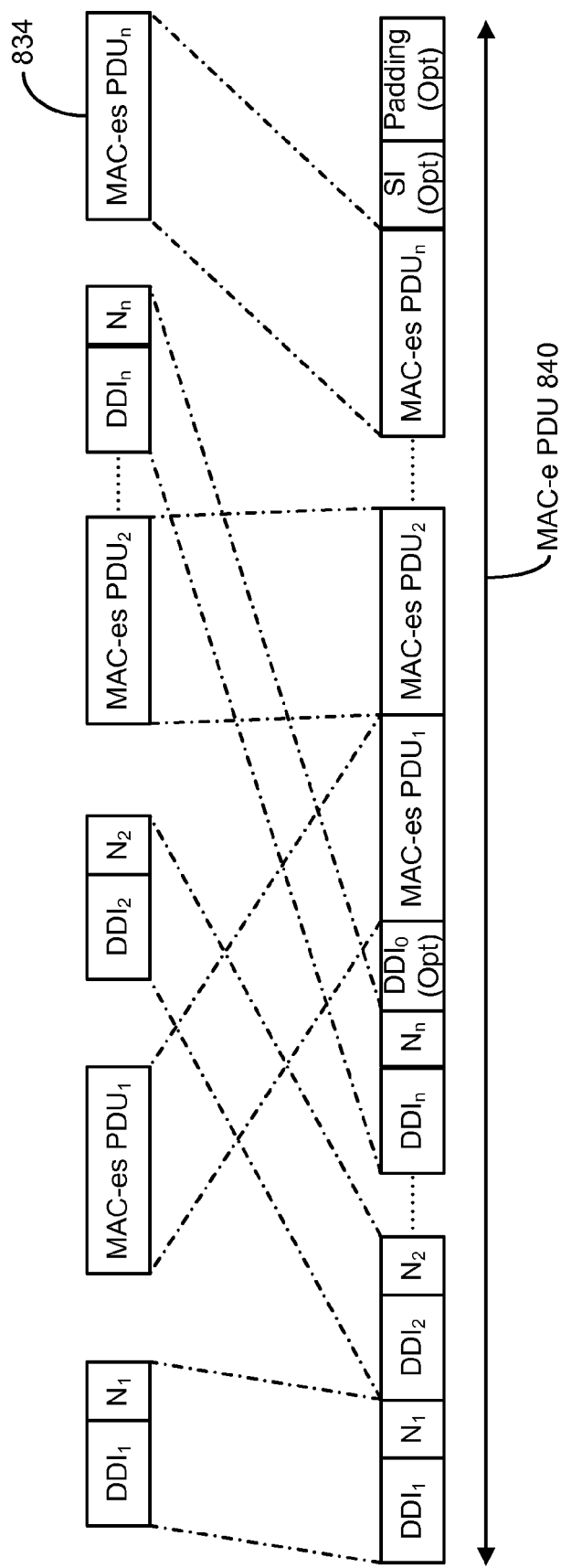
FIG. 8 illustrates a MAC-e PDU.

FIG. 8 illustrates a MAC-e PDU 840. A MAC-e PDU 840 may include multiple MAC-es PDUs 834.

The MAC-d entity 628 may construct MAC-d PDUs 738. MAC-d PDUs 738 may include data corresponding to a logical channel 322. The MAC-d entity 628 may provide MAC-d PDUs 738 to the MAC-e/es entity 630. The MAC-e/es entity 630 may construct MAC-e PDUs 840. As shown in FIG. 8, MAC-e PDUs 840 may include MAC-es PDUs 834. As shown in FIG. 7, MAC-es PDUs 734 may include MAC-d PDUs 738. MAC-e PDUs 840 may be transmitted on the E-DPDCH 526a.

Figure 9:
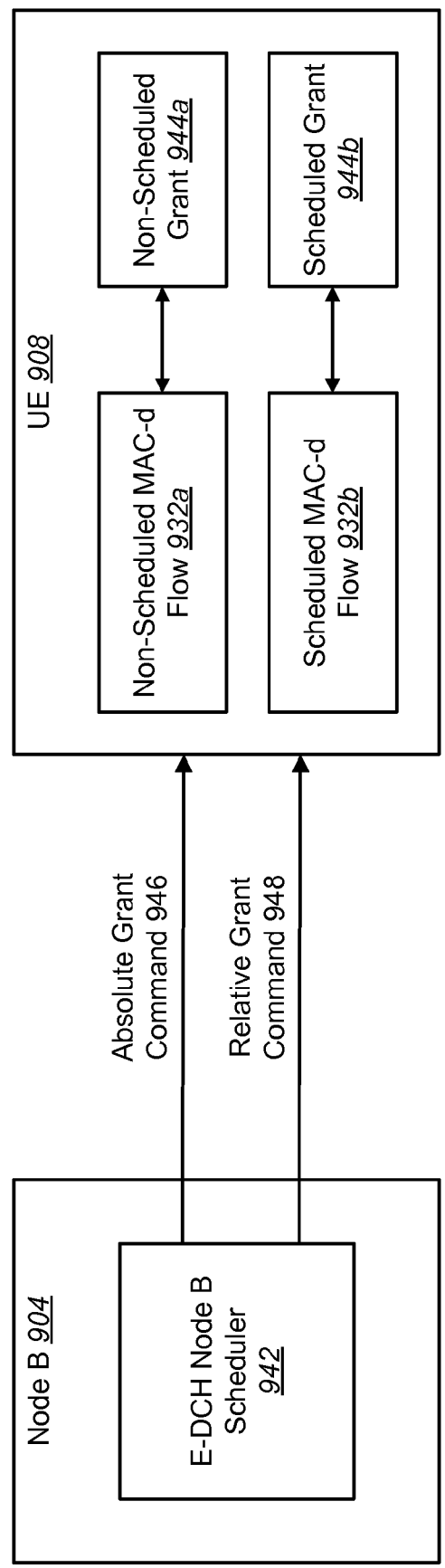
FIG. 9 illustrates a Node B scheduler.

FIG. 9 illustrates an E-DCH Node B scheduler 942 on a Node B 904. The Node B scheduler 942 may be responsible for allocating uplink 212 resources to UEs 908. In other words, the Node B scheduler 942 may control the amount of data that may be transmitted by UEs 908. The Node B scheduler 942 may allocate resources to a UE 908 by specifying parameters, such as the maximum value of power that the UE 908 is permitted to transmit on the uplink 212, a maximum allowed ratio between a data channel and a reference channel, etc. When a resource allocation is made to a UE 908 from a Node B scheduler 942, the UE 908 may construct one or more MAC-e PDUs 840 within the constraints of the resource allocation and then transmit the MAC-e PDU(s) 838 to a Node B 904 via the E-DCH transport channel 424b and the E-DPDCH physical channel 526a.

The Node B scheduler 942 may allocate a static resource at setup time for MAC-d flows 932a that are delay sensitive. These kinds of MAC-d flows 932a may be referred to as non-scheduled MAC-d flows 932a, and this type of resource allocation may be referred to as a non-scheduled grant 944a.

MAC-d flows 932b other than non-scheduled MAC-d flows 932a may be referred to as scheduled MAC-d flows 932b. The Node B scheduler 942 may dynamically allocate resources to scheduled MAC-d flows 932b. This type of resource allocation may be referred to as a scheduled grant 944b.

The Node B scheduler 942 may change the value of a scheduled grant 944b corresponding to a scheduled MAC-d flow 932b on a UE 908 by sending an absolute grant command 946 or a relative grant command 948 to the UE 908. An absolute grant command 946 may include an instruction to change the scheduled grant 944b corresponding to a scheduled MAC-d flow 932b to a new value. A relative grant command 948 may include an instruction to increase, decrease, or maintain the value of the scheduled grant 944b corresponding to a scheduled MAC-d flow 932b.

Figure 10:
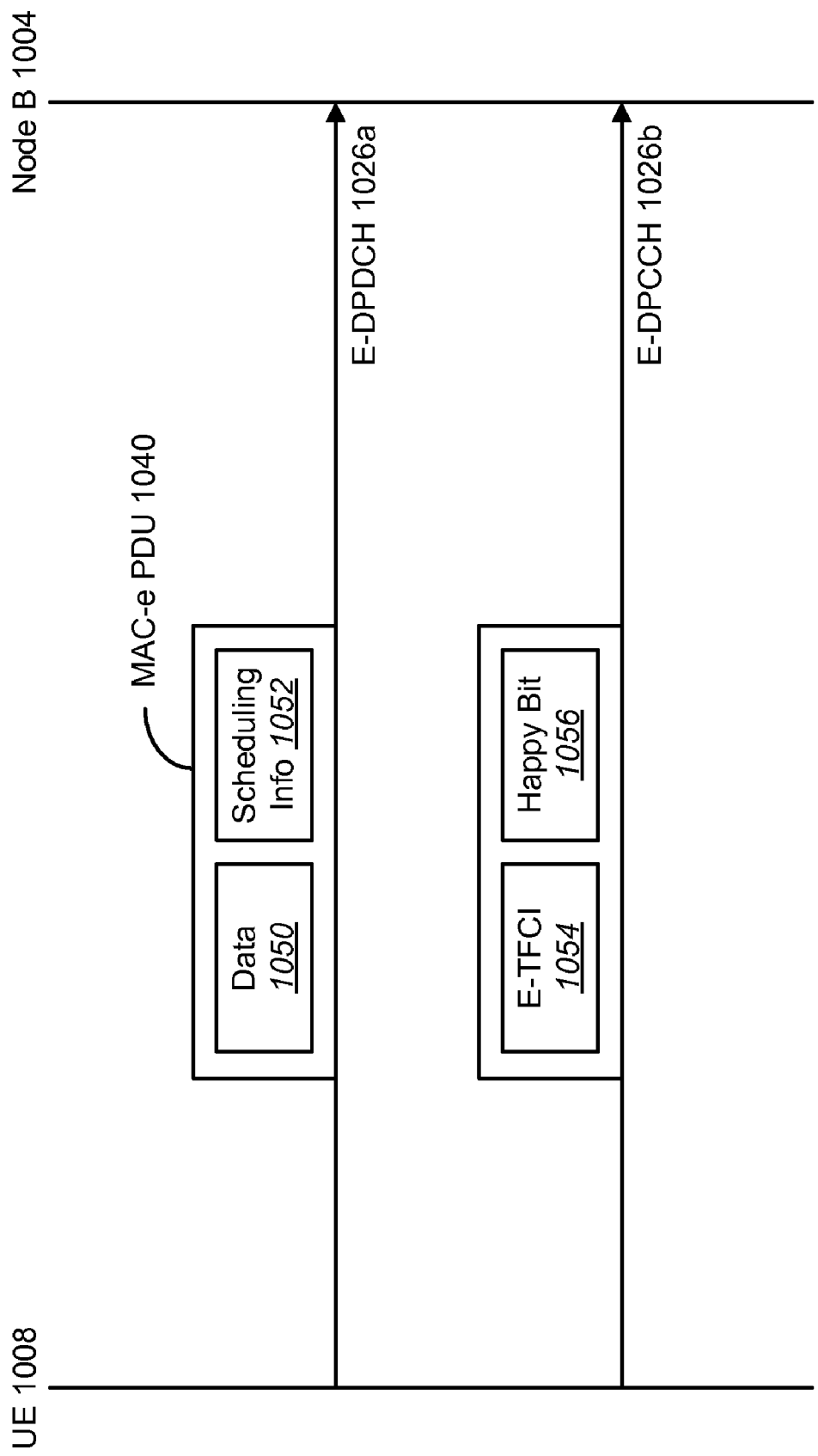
FIG. 10 shows a UE transmitting a MAC-e PDU to a Node B.

FIG. 10 shows a UE 1008 transmitting a MAC-e PDU 1040 to a Node B 1004 on an E-DPDCH 1026a. The MAC-e PDU 1040 is shown with data 1050 and scheduling information 1052. FIG. 10 also shows the UE 1008 transmitting an E-DCH Transport Format Combination Indicator (E-TFCI) 1054 and a happy bit 1056 on an E-DPCCH 1026b.

The UTMS specification describes control information that may be transmitted by a UE 1008 to indicate to the Node B scheduler 942 the amount of resources it would like to have allocated to it. The control information may include the scheduling information 1052. Scheduling information 1052 may be used to provide the Node B scheduler 942 with a better view of the amount of system resources that the UE 1008 would like to have allocated to it, as well as the amount of system resources that the UE 1008 may be able to make use of.

The control information may also include the happy bit 1056. There are two possible values for the happy bit 1056: a "not happy" value and a "happy" value. A "not happy" value indicates that the UE 1008 can use more resources. A "happy" value indicates that the UE 1008 does not currently need more resources than what is currently provided to it.

The E-TFCI 1054 indicates information for a MAC-e PDU 1040 that is being transmitted at the same time as the E-TFCI 1054. Whenever a MAC-e PDU 1040 is sent, an E-TFCI 1054 and a happy bit 1056 are also sent. The E-TFCI 1054 corresponding to a particular MAC-e PDU 1040 indicates how much data 1050 is being delivered in the MAC-e PDU 1040.

If the E-TFCI 1054 is set to a value of zero, this means that no data 1050 is being delivered in the MAC-e PDU 1040.

If the MAC-e PDU 1040 includes data 1050, then the value of the E-TFCI 1054 is greater than zero, and the MAC-e PDU 1040 may or may not include the scheduling information 1052. If the MAC-e PDU 1040 does not include data 1050, then the E-TFCI 1054 is set to a value of zero, and the MAC-e PDU 1040 includes scheduling information 1052.

The UMTS specification indicates that the transmission of scheduling information 1052 may be triggered under certain circumstances. For example, the transmission of scheduling information 1052 may be triggered when the UE 1008 has a scheduled grant 944b of zero (i.e., no resources have been allocated to the UE 1008 for transmission of scheduled MAC-d flows 932b) and the UE 1008 has data 1050 to transmit corresponding to one or more scheduled MAC-d flows 932b.

The UMTS specification also describes periodic transmission of scheduling information 1052. In particular, the UMTS specification describes two periodic timers: T_SING and T_SIG. The T_SING periodic timer may be used if the UE 1008 has a scheduled grant 944b of zero. In particular, if the UE 1008 has a scheduled grant 944b of zero, scheduling information 1052 may be sent periodically based on the T_SING timer value. The T_SIG periodic timer may be used if the UE 1008 has a non-zero scheduled grant 944b. In particular, if the UE 1008 has a non-zero scheduled grant 944b, scheduling information 1052 may be sent periodically based on the T_SIG timer value. In some implementations, the network may be configured without periodic timers, so that no periodic reporting occurs.

When the UE 1008 transmits scheduling information 1052, the Node B 1004 may respond by sending no response (DTX), an acknowledgement (ACK), or a negative acknowledgement (NACK). There is a non-zero probability of false detections. For example, a DTX may be interpreted as an ACK or a NACK, or vice versa.

There are times when a scheduled grant 944b for a scheduled MAC-d flow 932b may be insufficient, i.e., inadequate to permit the UE 1008 to transmit at least one MAC-d PDU 738 corresponding to the scheduled MAC-d flow 932b. As used herein, the term "insufficient scheduled grant" 944b may refer to any scheduled grant 944b that is inadequate to permit the UE 1008 to transmit at least one MAC-d PDU 738. An insufficient scheduled grant 944b may have a non-zero value and still be insufficient to permit the UE 1008 to transmit at least one MAC-d PDU 738.

There are many situations in which a UE 1008 may have an insufficient scheduled grant 944b. For example, a UE 1008 may have an insufficient scheduled grant 944b when the UE 1008 receives an absolute grant command 946 with a new value for the scheduled grant 944b, but the new value of the scheduled grant 944b is insufficient to transmit at least one MAC-d PDU 738. As another example, a UE 1008 may have an insufficient scheduled grant 944b when the UE 1008 receives a relative grant command 948 that directs the UE 1008 to decrease the current value of the scheduled grant 944b and that results in the current value of the scheduled grant 944b becoming insufficient to transmit at least one MAC-d PDU 738. As yet another example, the UE 1008 may have an insufficient scheduled grant 944b when the UE 1008 has a false detection of an absolute grant command 946 or a relative grant command 948 that results in the current value of the scheduled grant 944b becoming insufficient to transmit at least one MAC-d PDU 738.

With the current UMTS specification, a UE 1008 may end up in a deadlocked situation when the UE 1008 has an insufficient scheduled grant 944b. For example, suppose that the UE 1008 has a non-zero scheduled grant 944b that is insufficient to transmit at least one MAC-d PDU 738. If the T_SIG timer is not configured, the UE 1008 may be in a hung state (i.e., so that there is not any transmission from the UE 1008) as long as the scheduled grant 944b remains insufficient. Even if the T_SIG timer is configured, the sending of scheduling information 1052 may be delayed until the expiration of the T_SIG timer. This may affect the performance and/or the response time of the UE 1008.

As another example, suppose that the UE 1008 has a scheduled grant 944b of zero. In this case, the UE 1008 may end up in a deadlocked situation if the T_SING timer is not configured. For example, this may occur when the UE 1008 transmits scheduling information 1052 (with the E-TFCI 1054 set to a value of zero) the maximum number of times and none of these transmissions are received by the Node B scheduler 942 (e.g., under high mobility/fading conditions). In this case, the Node B scheduler 942 may not ever come to know that the UE 1008 has data 1050 to send but has a zero scheduled grant 944b.

As another example, the UE 1008 may end up in a deadlocked situation if the Node B 1004 fails to decode the transmission of the E-TFCI 1054 (set to a value of zero), but the UE 1008 incorrectly determines that it has received an ACK. In this case, the UE 1008 may stop transmitting scheduling information 1052 (with the E-TFCI 1054 set to a value of zero) and as a result the Node B scheduler 942 may never come to know that the UE 1008 has data 1050 to send but has a zero scheduled grant 944b.

As yet another example, the UE 1008 may end up in a deadlocked situation if the Node B 1004 decodes the E-TFCI 1054 (set to a value of zero), the UE 1008 receives an ACK in relation to the transmission of the E-TFCI 1054, the Node B scheduler 942 sends either an absolute grant command 946 or a relative grant command 948, but the UE 1008 does not receive the absolute grant command 946 or the relative grant command 948 from the Node B scheduler 942a. In this case, the Node B scheduler 942a may assume that the UE 1008 received the absolute grant command 946 or the relative grant command 948, and the UE 1008 may stop transmitting scheduling information 1052 (with the E-TFCI 1054 set to a value of zero).

Figure 11:
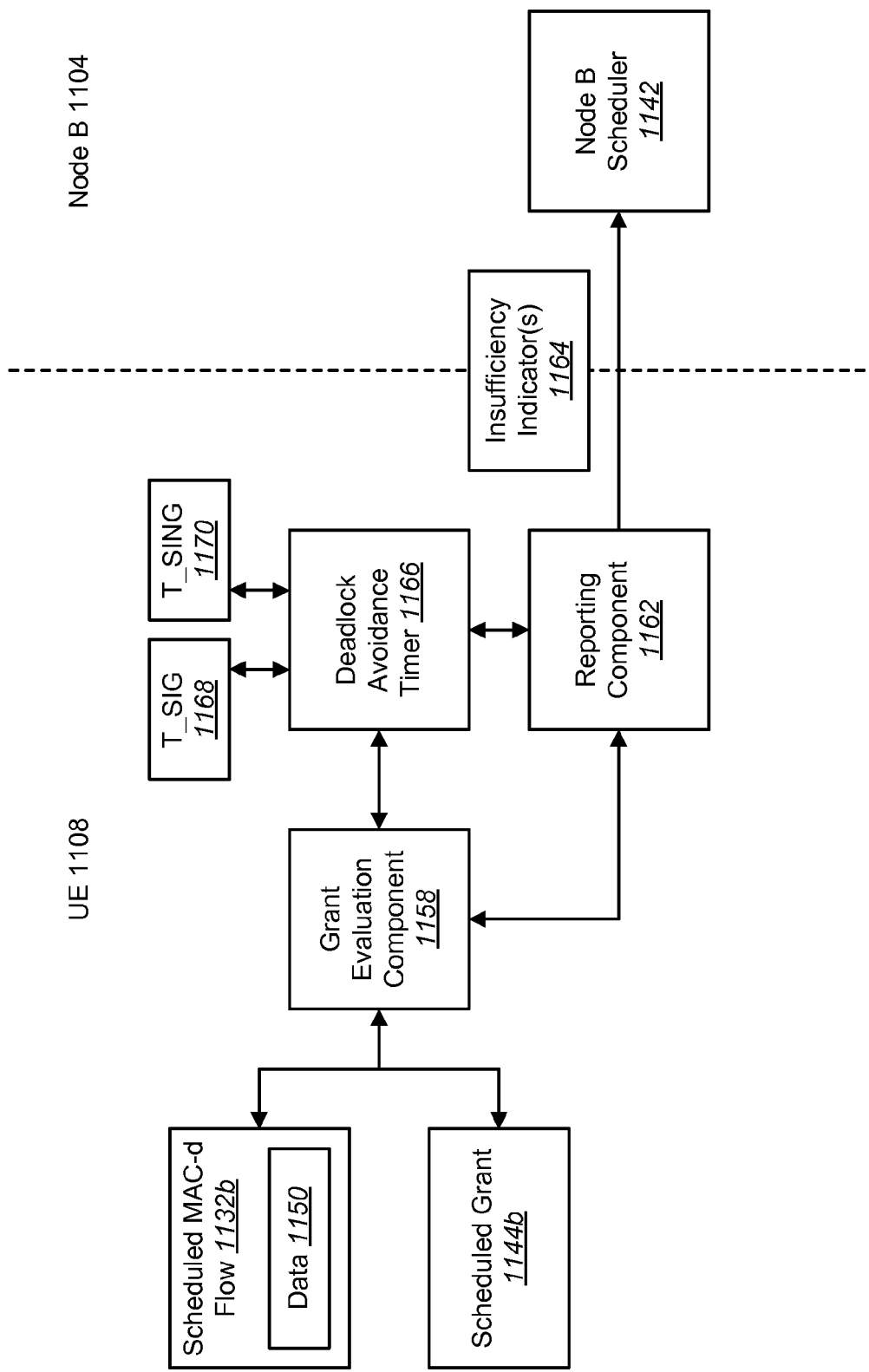
FIG. 11 illustrates various components that may be provided within a UE in order to reduce the likelihood of deadlock in a UMTS system.

As indicated above, the present disclosure relates to methods and apparatus for reducing the likelihood of deadlock (and in some cases, avoiding deadlock) in a wireless communication system, such as a UMTS system. FIG. 11 illustrates various components that may be provided within a UE 1108 in order to reduce the likelihood of deadlock in a UMTS system. The components that are shown in relation to the UE 1108 may be implemented by the MAC layer 318.

The UE 1108 is shown with a grant evaluation component 1158. The grant evaluation component 1158 may be configured to determine whether the UE 1108 has data 1150 to send corresponding to a scheduled MAC-d flow 1132b. For example, there may be a buffer 1172 for each logical channel 622 that is mapped onto a scheduled MAC-d flow 1132b, and the buffer 1172 may be monitored to see whether it is non-empty. The status of the buffer 1172 may be monitored continuously, e.g., once every transmission time interval (TTI).

If it is determined that there is data 1050 to send corresponding to a scheduled MAC-d flow 1132b, then the grant evaluation component 1158 may be configured to determine whether the UE 1108 has a scheduled grant 1144b that is sufficient so that the data 1050 (or at least some of the data 1050) may be transmitted. In particular, the grant evaluation component 1158 may be configured to determine whether the scheduled grant 1144b is sufficient to transmit at least one MAC-d PDU 738 from the scheduled MAC-d flow 1132b. For example, each logical channel 622 that is mapped onto a scheduled MAC-d flow 1132b may have a fixed PDU size 1174 associated with it. The UE 1108 may compare this fixed PDU size 1174 with the scheduled grant 1144b it has received to determine if at least a single MAC-d PDU 738 may be transmitted with the given scheduled grant 1144b.

The UE 1108 is also shown with a reporting component 1162. The reporting component 1162 may be configured to communicate with the Node B scheduler 1142 regarding the sufficiency of the scheduled grant 1144b. More specifically, if it is determined that there is data 1150 to send corresponding to the scheduled MAC-d flow 1132b, and also that the scheduled grant 1144b is insufficient to transmit at least one MAC-d PDU 738, the reporting component 1162 may transmit at least one insufficiency indicator 1164 to the Node B scheduler 1142. As used herein, the term "insufficiency indicator" 1164 refers to any communication from the UE 1108 to the Node B scheduler 1142 that may be interpreted by the Node B scheduler 1142 as an indication that the scheduled grant 1144b is insufficient to transmit at least one protocol data unit, such as a MAC-d PDU 738. One example of an insufficiency indicator 1164 is the E-TFCI 1054 (set to a value of zero). Another example of an insufficiency indicator 1164 is the happy bit 1056 (set to a value of unhappy). As indicated above, the E-TFCI 1054 and the happy bit 1056 may be transmitted when scheduling information 1052 is sent.

FIG. 11 also shows a retransmission timer 1166. The retransmission timer 1166 may be set when the UE 1108 determines that there is data 1150 to send corresponding to a scheduled MAC-d flow 1132b, and also that the scheduled grant 1144b is insufficient to transmit at least one MAC-d PDU 738. Whenever the retransmission timer 1166 expires, the UE 1108 may determine whether the scheduled grant 1144b is still insufficient to transmit at least one MAC-d PDU 738. If it is, the UE 1108 may re-transmit the insufficiency indicator(s) 1164 to the Node B scheduler 1142.

The retransmission timer 1166 may be a periodic timer, or it may be a non-periodic timer. In some cases, the retransmission timer 1166 may be both periodic and non-periodic (i.e., periodic under some circumstances and non-periodic under other circumstances).

There are many possible values for the retransmission timer 1166. For example, the value of the retransmission timer 1166 may be set equal to the value of the T_SIG timer 1168, or equal to the value of the T_SING timer 1170 (if the UE 1108 is configured with those timers 1168, 1170).

Another example relates to the MAC layer 318 functions corresponding to the Hybrid Automatic Repeat Request (HARQ) protocol. In accordance with the HARQ protocol, a maximum number of HARQ retransmissions of E-TFCI=0 may be defined. Also, a parameter referred to as the HARQ round-trip time (RTT) may be defined. The value of the retransmission timer 1166 may be set equal to the maximum number of HARQ retransmissions of E-TFCI=0 multiplied with the HARQ RTT. For example, if the maximum number of HARQ retransmissions of E-TFCI=0 were eight, and one TTI=10 ms (i.e., the HARQ RTT=40 ms), then the retransmission timer 1166 may be set to 8×40 ms=320 ms.

When the UE 1108 receives a scheduled grant 1144b that is sufficient to transmit at least one MAC-d PDU 738, then at least one MAC-d PDU 738 that includes data 1150 corresponding to the scheduled MAC-d flow 1132b may be transmitted. In addition, the retransmission timer 1166 may be stopped, so that no further insufficiency indicators 1164 are sent to the Node B scheduler 1142 until the next time that the scheduled grant 1144b becomes insufficient.

In an alternative configuration, a UE 108 may be provided that does not include a retransmission timer 1166, but that implements other techniques described above in relation to the UE 1108 of FIG. 11. Such a UE 108 may be configured to transmit at least one insufficiency indicator 1164 in response to determining that there is data 1150 to transmit corresponding to a scheduled MAC-d flow 1132b, but that the scheduled grant 1144b corresponding to the scheduled MAC-d flow 1132b is insufficient to transmit at least one MAC-d PDU 738. However, once the initial insufficiency indicator(s) 1164 is/are transmitted, the UE 108 may not transmit additional insufficiency indicator(s) 1164 thereafter. In other words, the transmission of the insufficiency indicator(s) 1164 may be a one-time occurrence.

Figure 12:
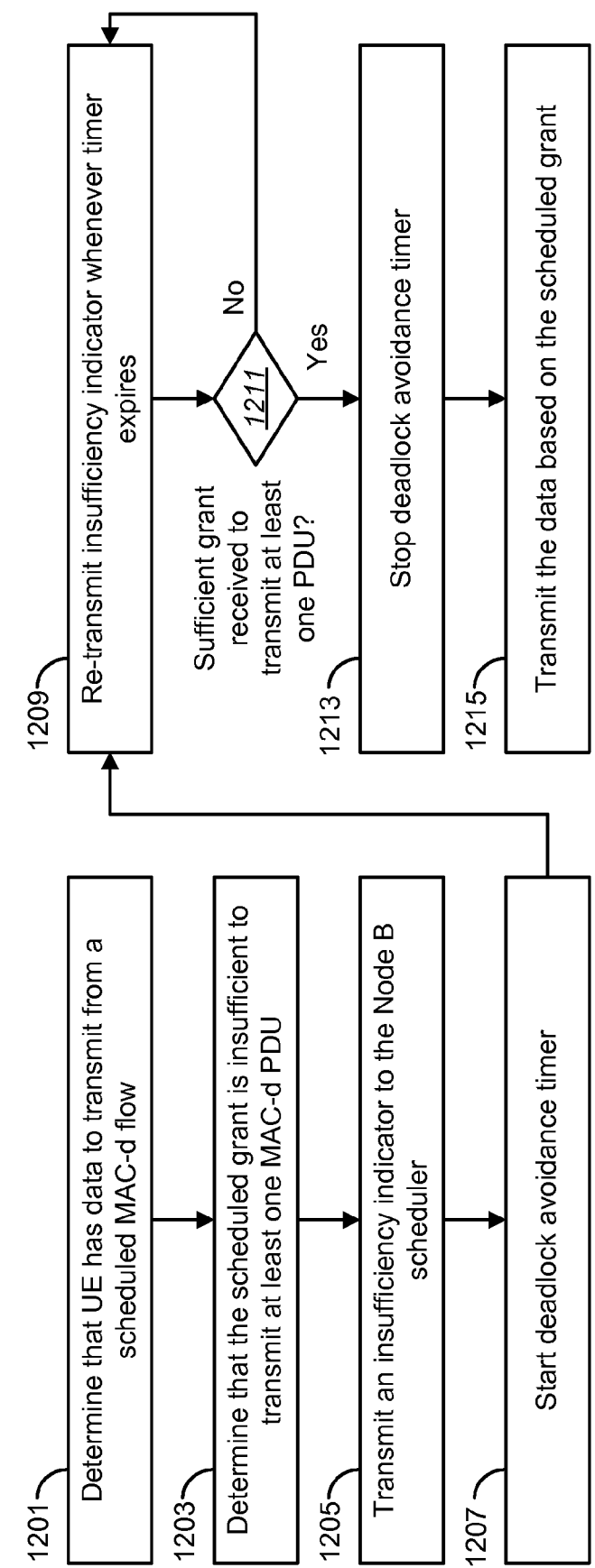
FIG. 12 illustrates a method for reducing the likelihood of deadlock in a UMTS system.

FIG. 12 illustrates a method 1200 for reducing the likelihood of deadlock in a UMTS system. The depicted method 1200 may be performed by a UE 1108 when it determines 1201 that it has data 1150 to transmit from a scheduled MAC-d flow 1132b, and when the UE 1108 also determines 1203 that the scheduled grant 1144b corresponding to the scheduled MAC-d flow 1132b is insufficient to transmit at least one MAC-d PDU 738.

In response to making these two determinations 1201, 1203, the UE 1108 may communicate to the Node B scheduler 1142 that the scheduled grant 1144b is insufficient to transmit at least one MAC-d PDU 738. This may involve transmitting 1205 at least one insufficiency indicator 1164 to the Node B scheduler 1142.

As discussed above, one example of an insufficiency indicator 1164 is the E-TFCI 1054 (set to a value of zero). Another example of an insufficiency indicator 1164 is the happy bit 1056 (set to a value of unhappy). In accordance with the current version of the UMTS specification, when scheduling information 1052 is transmitted, the E-TFCI 1054 and the happy bit 1056 will also be transmitted with the scheduling information 1052. The scheduling information 1052 is transmitted on the E-DPDCH 526a, while the E-TFCI 1054 and the happy bit 1056 are transmitted on the E-DPCCH 526b. The E-TFCI 1054 will be set to a value of zero because no data 1150 is being transmitted with the scheduling information 1052. The happy bit 1056 may be set to a value of unhappy so that the happy bit 1056 correctly reflects the current resource needs of the UE 1108. Setting the happy bit 1056 in this manner may be advantageous because some UMTS systems only use the happy bit 1056 to schedule appropriate resources to the UE 1108.

The UE 1108 may also start 1207 an internal timer, which may be referred to as a retransmission timer 1166. The retransmission timer 1166 may begin when the insufficiency indicator(s) 1164 is/are transmitted 1205. The timer 1166 may continue 1108 to run as long as the scheduled grant 1144b is insufficient to transmit at least one MAC-d PDU 738 from a scheduled MAC-d flow 1132b.

Whenever the timer 1166 expires, the UE 1108 may re-transmit 1209 the insufficiency indicator(s) 1164. Before re-transmitting 1209 the insufficiency indicator(s) 1164, the UE 1108 may confirm that the scheduled grant 1144b is still insufficient.

While the UE 1108 is repeatedly transmitting 1209 the insufficiency indicator(s) 1164 in this manner, the UE 1108 may also determine 1211 whether the scheduled grant 1144b is still insufficient to transmit at least one MAC-d PDU 738 from a scheduled MAC-d flow 1132b. This determination 1211 may be made on a periodic basis or on a non-periodic basis.

If the UE 1108 determines 1211 that the scheduled grant 1144b is still insufficient to transmit one MAC-d PDU 738 from a scheduled MAC-d flow 1132b, then the UE 1108 may continue to re-transmit 1209 the insufficiency indicator(s) 1164 whenever the retransmission timer 1166 expires. Once the UE 1108 determines 1211 that it has received a scheduled grant 1144b that is sufficient to transmit at least one MAC-d PDU 738 from a scheduled MAC-d flow 1132b, then the retransmission timer 1166 may be stopped 1213, and the data 1150 may be transmitted 1215 based on the scheduled grant 1144b.

Thus, in accordance with the depicted method 1200, when the UE 1108 has an insufficient scheduled grant 1144b, the UE 1108 may repeatedly transmit at least one insufficiency indicator 1164 until the scheduled grant 1144b becomes sufficient to transmit at least one MAC-d PDU 738 from a scheduled MAC-d flow 1132b. In this context, the term "repeatedly" means multiple times. The repeated transmissions of the insufficiency indicator(s) 1164 may be either periodic or non-periodic.

As discussed above, with the current UMTS specification, the UE 1108 may end up in a deadlocked situation when the UE 1108 has an insufficient scheduled grant 1144b. In other words, the UE 1108 may stop transmitting scheduling information 1052 (with the E-TFCI 1054 set to a value of zero), and as a result the Node B scheduler 1142 may not be able to determine that the UE 1108 has some data 1050 to send but has an insufficient scheduled grant 1144b to transmit even a single MAC-d PDU 738. The techniques described herein may avoid such deadlock by ensuring that scheduling information 1052 (with the E-TFCI 1054 set to a value of zero) continues to be transmitted, even if the scenarios described above were to occur. Even for UMTS systems that only use the happy bit 1056 for scheduling, the techniques described herein may prevent deadlock situations when the UE 1108 has an insufficient scheduled grant 1144b, because the happy bit 1056 is set to a value of unhappy when the scheduling information 1052 is sent.

The techniques described herein may successfully avoid deadlock when the T_SIG and T_SING timers are not configured. Even when these timers are configured, the techniques described herein may improve the performance of the UE 1108.

Under some circumstances, the techniques described herein may not completely avoid deadlock. In a UMTS system, the UE 1108 may be completely dependent on the Node B scheduler 1142 to provide a sufficient scheduled grant 1144b so that the UE 1108 is not in a deadlocked situation. However, it is not guaranteed that the Node B scheduler 1142 will provide a sufficient scheduled grant 1144b to the UE 1108, even if the UE 1108 repeatedly transmits insufficiency indicators 1164 as described above. Hence, the UE 1108 may continue to remain in deadlock in-spite of repeatedly transmitting insufficiency indicators 1164. However, it is contemplated that the techniques described herein may reduce the likelihood that deadlock will occur, and in some cases, deadlock may be completed avoided.

Figure 13:
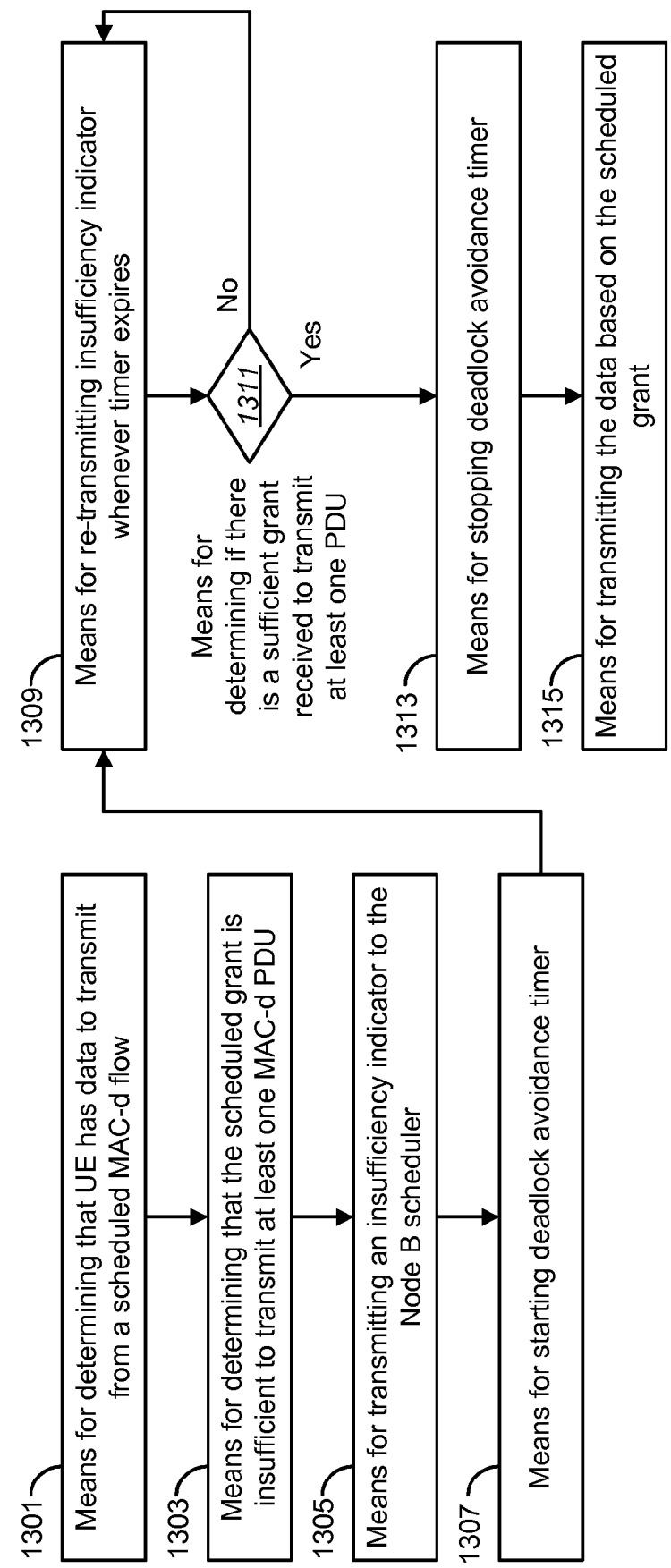
FIG. 13 illustrates means-plus-function blocks corresponding to the method shown in FIG. 12.

The method 1200 of FIG. 12 described above may be performed by corresponding means-plus-function blocks 1300 illustrated in FIG. 13. In other words, blocks 1201 through 1215 illustrated in FIG. 12 correspond to means-plus-function blocks 1301 through 1315 illustrated in FIG. 13.

Figure 14:
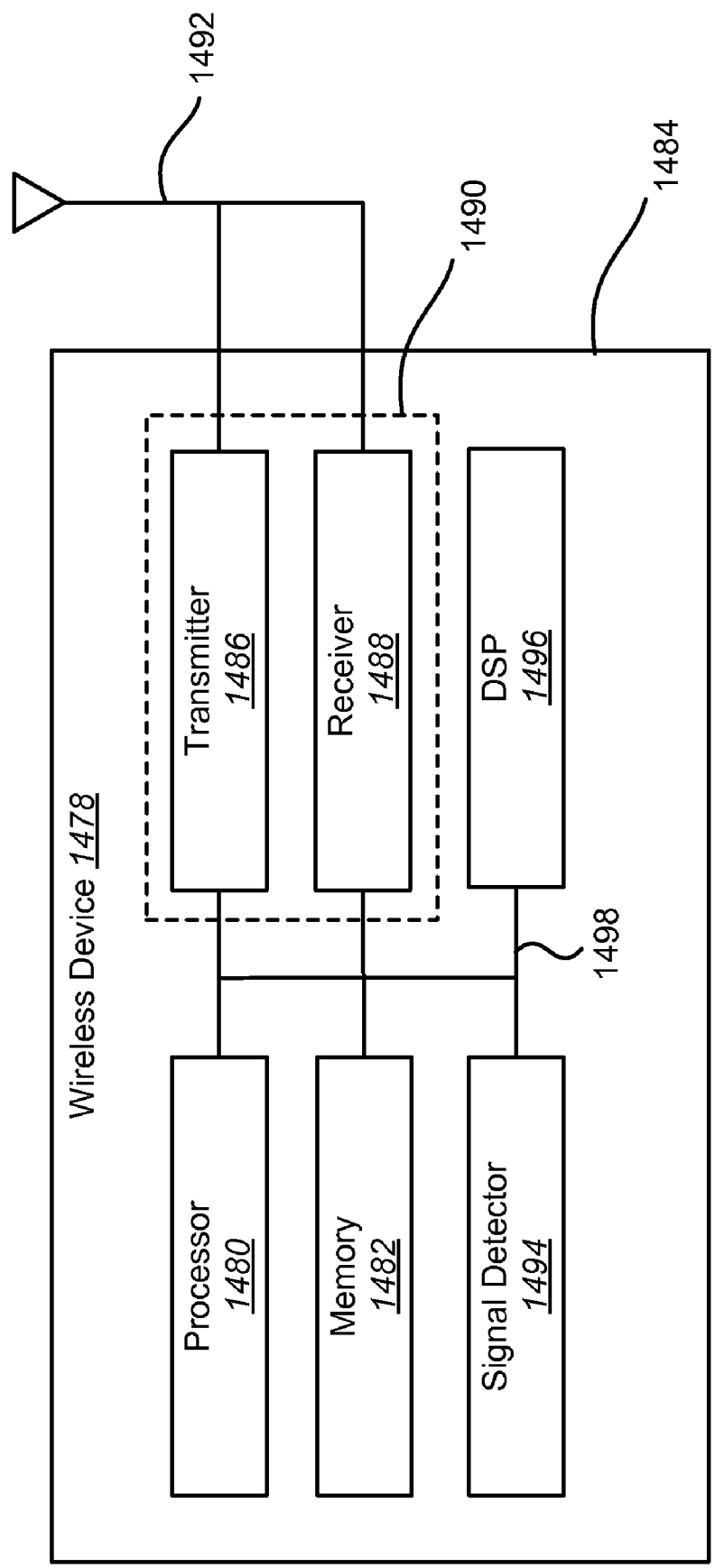
FIG. 14 illustrates various components that may be utilized in a wireless device.

FIG. 14 illustrates various components that may be utilized in a wireless device 1478. The wireless device 1478 is an example of a device that may be configured to implement the various methods described herein. The wireless device 1478 is an example of the UEs 108 referred to above.

The wireless device 1478 may include a processor 1480 which controls operation of the wireless device 1478. The processor 1480 may also be referred to as a CPU. Memory 1482, which may include both read-only memory (ROM) and random access memory (RAM), provides instructions and data to the processor 1480. A portion of the memory 1482 may also include non-volatile random access memory (NVRAM). The processor 1480 typically performs logical and arithmetic operations based on program instructions stored within the memory 1482. The instructions in the memory 1482 may be executable to implement the methods described herein.

The wireless device 1478 may also include a housing 1484 that may include a transmitter 1486 and a receiver 1488 to allow transmission and reception of data between the wireless device 1478 and a remote location. The transmitter 1486 and receiver 1488 may be combined into a transceiver 1490. An antenna 1492 may be attached to the housing 1484 and electrically coupled to the transceiver 1490.

The wireless device 1478 may also include a signal detector 1494 that may be used to detect and quantify the level of signals received by the transceiver 1490. The signal detector 1494 may detect such signals as total energy, pilot energy per pseudonoise (PN) chips, power spectral density, and other signals. The wireless device 1478 may also include a digital signal processor (DSP) 1496 for use in processing signals.

The various components of the wireless device 1478 may be coupled together by a bus system 1498 which may include a power bus, a control signal bus, and a status signal bus in addition to a data bus. However, for the sake of clarity, the various busses are illustrated in FIG. 14 as the bus system 1498.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for reducing the likelihood of deadlock in a wireless communication system, comprising:
   determining that user equipment has data to transmit, wherein the data corresponds to a scheduled flow, and wherein the scheduled flow comprises a flow other than a non-scheduled flow that is delay sensitive;

determining that a scheduled grant corresponding to the scheduled flow is insufficient to transmit at least one protocol data unit (PDU), wherein the scheduled grant comprises a dynamic resource allocation to the scheduled flow, and wherein the determining that the scheduled grant corresponding to the scheduled flow is insufficient comprises comparing a fixed size of the at least one PDU with the scheduled grant; and transmitting an insufficiency indicator, in response to determining that the scheduled grant is insufficient to transmit at least one protocol data unit, to a scheduler at least once to reduce the likelihood of deadlock, wherein the at least once transmitted insufficiency indicator comprises an indication that the scheduled grant is insufficient to transmit at least one protocol data unit.

2. The method of claim 1, wherein the insufficiency indicator is transmitted repeatedly until the user equipment determines that the scheduled grant is no longer insufficient to transmit the at least one protocol data unit.

3. The method of claim 1, wherein the wireless communication system is configured in accordance with the Universal Mobile Telecommunications System, wherein the insufficiency indicator is transmitted on an Enhanced Uplink Dedicated Channel (E-DCH) Dedicated Physical Control Channel (E-DPCCH), and wherein the data is transmitted on an E-DCH Dedicated Physical Data Channel (E-DPDCH).

4. The method of claim 1, wherein the insufficiency indicator comprises an Enhanced Dedicated Channel Transport Format Combination Indicator (E-TFCI) that is set equal to zero.

5. The method of claim 1, wherein the insufficiency indicator comprises a happy bit that is set to a value of unhappy.

6. The method of claim 1, further comprising starting a deadlock avoidance timer in response to determining that the scheduled grant is insufficient, and wherein the insufficiency indicator is transmitted whenever the deadlock avoidance timer expires as long as the scheduled grant is still insufficient.

7. The method of claim 6, wherein the deadlock avoidance timer is periodic.

8. The method of claim 6, wherein the deadlock avoidance timer is non-periodic.

9. The method of claim 6, wherein the deadlock avoidance timer is set equal to a T_SIG timer.

10. The method of claim 6, wherein the deadlock avoidance timer is set equal to a T_SING timer.

11. User equipment that is configured for reducing the likelihood of deadlock in a wireless communication system, comprising:

a processor;
memory in electronic communication with the processor;
instructions stored in the memory, the instructions being executable to:
    determine that user equipment has data to transmit, wherein the data corresponds to a scheduled flow, and wherein the scheduled flow comprises a flow other than a non-scheduled flow that is delay sensitive;
    determine that a scheduled grant corresponding to the scheduled flow is insufficient to transmit at least one protocol data unit (PDU) by comparing a fixed size of the at least one PDU with the scheduled grant, wherein the scheduled grant comprises a dynamic resource allocation to the scheduled flow; and
    transmit an insufficiency indicator, in response to having determined that the scheduled grant is insufficient to transmit at least one protocol data unit, to a scheduler at least once to reduce the likelihood of deadlock, wherein the at least once transmitted insufficiency indicator comprises an indication that the scheduled grant is insufficient to transmit at least one protocol data unit.

12. The user equipment of claim 11, wherein the insufficiency indicator is transmitted repeatedly until the user equipment determines that the scheduled grant is no longer insufficient to transmit the at least one protocol data unit.

13. The user equipment of claim 11, wherein the wireless communication system is configured in accordance with the Universal Mobile Telecommunications System, wherein the insufficiency indicator is transmitted on an Enhanced Uplink Dedicated Channel (E-DCH) Dedicated Physical Control Channel (E-DPCCH), and wherein the data is transmitted on an E-DCH Dedicated Physical Data Channel (E-DPDCH).

14. The user equipment of claim 11, wherein the insufficiency indicator comprises an Enhanced Dedicated Channel Transport Format Combination Indicator (E-TFCI) that is set equal to zero.

15. The user equipment of claim 11, wherein the insufficiency indicator comprises a happy bit that is set to a value of unhappy.

16. The user equipment of claim 11, wherein the instructions are also executable to start a deadlock avoidance timer in response to determining that the scheduled grant is insufficient, and wherein the insufficiency indicator is transmitted whenever the deadlock avoidance timer expires as long as the scheduled grant is still insufficient.

17. The user equipment of claim 16, wherein the deadlock avoidance timer is periodic.

18. The user equipment of claim 16, wherein the deadlock avoidance timer is non-periodic.

19. The user equipment of claim 16, wherein the deadlock avoidance timer is set equal to a T_SIG timer.

20. The user equipment of claim 16, wherein the deadlock avoidance timer is set equal to a T_SING timer.

21. An apparatus for reducing the likelihood of deadlock in a wireless communication system, comprising:

means for determining that user equipment has data to transmit, wherein the data corresponds to a scheduled flow, and wherein the scheduled flow comprises a flow other than a non-scheduled flow that is delay sensitive;
means for determining that a scheduled grant corresponding to the scheduled flow is insufficient to transmit at least one protocol data unit (PDU), wherein the scheduled grant comprises a dynamic resource allocation to the scheduled flow, and wherein the means for determining that the scheduled grant corresponding to the scheduled flow is insufficient comprises means for comparing a fixed size of the at least one PDU with the scheduled grant; and
means for transmitting an insufficiency indicator, in response to the determination by the means for determining that the scheduled grant is insufficient to transmit at least one protocol data unit, to a scheduler at least once to reduce the likelihood of deadlock, wherein the at least once transmitted insufficiency indicator comprises an indication that the scheduled grant is insufficient to transmit at least one protocol data unit.

22. The apparatus of claim 21, wherein the insufficiency indicator comprises:
    an Enhanced Dedicated Channel Transport Format Combination Indicator (E-TFCI) that is set equal to zero; and
    a happy bit that is set to a value of unhappy.

23. The apparatus of claim 21, further comprising means for starting a deadlock avoidance timer in response to determining that the scheduled grant is insufficient, and wherein the insufficiency indicator is transmitted whenever the deadlock avoidance timer expires as long as the scheduled grant is still insufficient.

24. A computer-program product for reducing the likelihood of deadlock in a wireless communication system, the computer-program product comprising a non-transitory computer readable medium having instructions thereon, the instructions comprising:

code for determining that user equipment has data to transmit, wherein the data corresponds to a scheduled flow, and wherein the scheduled flow comprises a flow other than a non-scheduled flow that is delay sensitive;

code for determining that a scheduled grant corresponding to the scheduled flow is insufficient to transmit at least one protocol data unit (PDU), wherein the scheduled grant comprises a dynamic resource allocation to the scheduled flow, and wherein the code for determining that the scheduled grant corresponding to the scheduled flow is insufficient comprises code for comparing a fixed size of the at least one PDU with the scheduled grant; and code for transmitting an insufficiency indicator, in response to the determination by the code for determining that the scheduled grant is insufficient to transmit at least one protocol data unit, to a scheduler at least once to reduce the likelihood of deadlock, wherein the at least once transmitted insufficiency indicator comprises an indication that the scheduled grant is insufficient to transmit at least one protocol data unit.

25. The computer-program product of claim 24, wherein the insufficiency indicator comprises:

an Enhanced Dedicated Channel Transport Format Combination Indicator (E-TFCI) that is set equal to zero; and a happy bit that is set to a value of unhappy.

26. The method of claim 1, wherein the at least one entire PDU is to be transmitted in no more than one wireless transmission.

27. The method of claim 1, wherein transmitting the insufficiency indicator comprises transmitting scheduling information that includes the fixed size of the at least one PDU.

* * * * *